United States Patent [19]

Mallow

[11] Patent Number: 4,545,820

[45] Date of Patent: Oct. 8, 1985

[54] SOIL STABILIZER AND METHOD FOR STABILIZING SOIL

[75] Inventor: William A. Mallow, San Antonio, Tex.

[73] Assignee: Gas Research Institute, Chicago, Ill.

[21] Appl. No.: 512,761

[22] Filed: Jul. 13, 1983

Related U.S. Application Data

[63] Continuation-in-part of Ser. No. 404,336, Jul. 30, 1982, abandoned.

[51] Int. Cl.$^4$ .......................... C04B 7/35; C04B 35/16
[52] U.S. Cl. ........................................ 106/76; 106/77; 106/89; 106/900
[58] Field of Search ...................... 106/76, 77, 89, 900

[56] References Cited

U.S. PATENT DOCUMENTS

| | | | |
|---|---|---|---|
| 2,522,707 | 9/1950 | Faber et al. | 106/76 |
| 3,335,018 | 8/1967 | Peeler et al. | 106/89 |
| 4,391,643 | 7/1983 | Murphey | 106/76 |
| 4,402,749 | 9/1983 | Hall et al. | 106/76 |

FOREIGN PATENT DOCUMENTS 79780  7/1978  Japan ..................... 106/76

*Primary Examiner*—Mark L. Bell
*Attorney, Agent, or Firm*—Sigalos & Levine

[57] ABSTRACT

A soil stabilizing composition comprising Portland cement and a hydrated alkali metal silicate powder and the method of stabilizing soil comprising admixing the composition with a soil and compressing the mixture.

10 Claims, No Drawings

SOIL STABILIZER AND METHOD FOR STABILIZING SOIL

This application is a continuation-in-part of my co-pending application Ser. No. 404,336, filed July 30, 1982, which is now abandoned.

BACKGROUND OF THE INVENTION

The present invention is directed to the field of soil stabilization and particularly to providing nonshrinking, nonsubsiding backfill for trenches or soil surfaces which permits immediate restoration to a usable surface.

Many surfaces such as paved surfaces must be torn up in order to attend to some subsurface matter such as a ruptured pipe or placement of new underground facilities. After the subsurface matter has been attended to the material removed from the hole, commonly known as "spoil", is then placed back in the hole, tamped into place and one must wait until the surface has sufficiently stabilized before repaving. In situations where trafficked surfaces are involved, this has presented quite a time problem since the area must remain closed to traffic for a period of time for the soil to stabilize before it can be restored as a trafficable surface. This problem is compounded in many cases where there has been, for example, a water leak and the resultant soil is quite wet. It takes a long period of time before such soil becomes sufficiently conditioned to permit its reuse as a trafficable surface.

Efforts to ameliorate this problem have included admixing of various materials with the soil in an effort to overcome this problem, most usually materials such as quick lime in the form of stones. These are not suitable with dry spoil and while generally suitable in cases where the soil is wet, they still are not sufficiently rapid in their action to provide a stable, nonshrinking, nonsubsiding backfill which permits almost immediate restoration of the surface for use by vehicles, pedestrians and the like.

SUMMARY OF THE INVENTION

The present invention provides a pulverulent soil stabilizing composition and method which permits almost immediate use and restoration of the surface, which soil stabilizer will provide a nonshrinking, nonsubsiding backfill.

Briefly stated, the present composition comprises as essential components Portland cement and a hydrated alkali metal silicate powder. In some instances, as disclosed below, it has been found advantageous to include Plaster of Paris, a thickening agent, and/or an alkali metal silicofluoride in the composition.

The invention also comprises the method of stabilizing soil utilizing such composition.

DETAILED DESCRIPTION

The essential components of the present composition are Portland cement and a hydrated alkali metal silicate powder. Additives which can be added to the composition are calcium sulfate hemihydrate (Plaster of Paris) and/or a thickening agent, and/or an alkali metal silicofluoride. The Plaster of Paris assists in stabilizing the soil, the thickening agent can be added if the spoil contains a high percentage of water in order to make it stabilize quickly, and the silicofluoride aids in providing rapid setting of the treated soil.

It is important to emphasize that the particular additives included with the essential components are determined by the particulars of the spoil and, most importantly, the water content. With "normal" spoil having around 7 to 10 percent water, it is not necessary for optimum effects to utilize the Plaster of Paris or the thickening agent. With water contents exceeding 10 percent, then it is advisable for optimum results to use these other materials.

As to the essential components, any commercially available Portland cement can be utilized. As to the silicate, it is preferred to utilize hydrated sodium silicate powder, sodium metasilicate hydrate powder or mixtures thereof. It is also preferred to include sodium silicofluoride to the composition as the alkali metal silicofluoride where there is no concern for fluoride levels in subsurface water tables.

It is most advantageous if all components be in fine particulate form in order to permit thorough blending of the components in forming the composition.

With respect to the desirable additives, any commercial grade of Plaster of Paris is suitable, preferably, again, in finely divided form. With respect to the thickening agent, it can be naturally occurring or synthetic polymer such as guar gum, polyvinyl alcohol, alginates, caseinates, acrylic polymer-starch products (acrylic modified starches), mixtures thereof, and other materials that thicken in the presence of water. It is preferred to use the guar gum because of its low cost. Acrylic modified starches, such as the commercially available HENKEL SGP-502; used alone or in combination with guar gum, give the best thickening results per unit weight, but are costly and, thus, not as commercially desirable as the guar gum.

It should be added that the subject composition can also be used as a soil cement and placed on the surfaces of soils in order to make them more water resistant, as well as nonshrinking and nonsubsiding. As for example, stabilizing dirt driveways or dirt roads and the like.

When referring to "spoil" herein, it is intended to include soils comprising silt, sandy loam, clay, gravel, and/or sand.

If desired, other materials can be added to the composition in order to give effects not related to the performance of the product. For example, since these products are used out in the open, in some instances it may be desirable to try and suppress the dustiness of the product in use, and commercially available dust suppressants such as quaternary ammonium surfactants (HYAMINE 3500) can be utilized to minimize dusting by adding them to the stabilizing composition in a proportion of up to about 3 parts by weight surfactant for each 100 parts by weight of the composition. While such surfactants are initially effective, it has been found that they lose their efficacy in the composition after a short period of time. It has been found that the diesters of dibasic acids are most suitable for use as dust suppressants since they maintain such suppressant capability in the composition over long periods of time. Examples of suitable diesters are dimethyl succinate, dimethyl glutamate, dimethyladipate, mixtures thereof and the like which are also used in amounts up to 3 parts by weight for each 100 parts by weight of the composition.

Also, colorants can be added should one wish to have a colored surface when the composition is used as a soil cement or uses the color as an indicator of homogeneity of the blending of the composition with soil. Suitable colorants are iron oxides, carbon black, titania, and the like. These materials can be added in their usual amounts and for the usual effects.

As to proportions, it is generally desired to use the following:

|  | % by Weight of the Composition | |
|---|---|---|
|  | Essential | Preferred |
| Portland Cement | 15–90 | 50–80 |
| Hydrated Alkali Metal Silicate Powders | 8–50 | 50–80 |
| Alkali Metal Silicofluoride | 0 | 4–10 |
| Plaster of Paris | 0 | 2–10 |
| Thickener | 0 | 2–10 |
| Dust Suppressant | 0 | .5–3 |

It will be understood that these are optimum ranges and slight adjustments outside these ranges can be used and will be operative depending on the particular soil conditions. As noted, for prompt setting formulations, in moist conditions, it is preferred to add amounts of all of these components. In circumstances where slow setting compositions can be used, one can eliminate the use of the sodium silicofluoride but, as noted, this detracts from speed of restoration of the surface to desired use.

In forming the composition, it is only necessary that the pulverulent components be blended together, in any conventional mixing device, to give a substantially uniform composition.

The method of utilizing the composition involves admixing the same with the spoil or soil. In practice, the spoil, before being returned to the area, such as a trench, to be filled or to be made water resistant, is simply spread, the desired amount of the composition admixed therewith, and the entire mixture of spoil and stabilizing composition then added to the trench, for example, and tamped into place. If the trench were in a paved surface it can be immediately repaved and restored to use by traffic. If the soil is unusually dry, that is below about 7 to 10 percent, it is most desirable to add water to the soil, either before or after the soil stabilizing composition of the present invention is added thereto, to raise the moisture content to at least about 7%.

In utilizing the composition as a soil cement, the surface to be treated is simply first scraped or otherwise loosened and the composition admixed therewith. If the soil is dry, an amount of water to bring it up to a level of 7 to 10 percent is added and the mixing together of the composition with the soil is done to make it as uniform as possible after which the soil is simply tamped down either by means of a tamp or by means of a conventional road roller.

As to proportions, it is preferred to utilize about 4 to 5 parts by weight of the soil stabilizer of the present invention for each 100 parts by weight of the soil. While larger amounts can be used and may be necessary in some rare circumstances, it is not desirable to do so since it adds to the cost of the treatment. In some instances with drier soils or with soil that tends to be more stable than others, it is possible to use lower amount levels down to, for example, of from about 1 to 2 percent by weight.

The compositions of the present invention demonstrate effective stabilization of soils against subsidence and are applicable under all weather conditions, such as snow, cold, or hot weather.

The invention will be further described in connection with the following examples which are set forth for purposes of illustration only and in which proportions are in percent by weight of the total composition unless expressly stated to the contrary.

EXAMPLES 1 to 7

A series of seven soil stabilizing compositions was made by mixing together the components in the percent by weight set forth below:

|  | 1 | 2 | 3 | 4 | 5 | 6 | 7 |
|---|---|---|---|---|---|---|---|
| Portland Cement | 28 | 51 | 63 | 28 | 51 | 63 | 70 |
| Hydrated Sodium Silicate Powder (BRITESIL GA) | 46 | 31 | 23 | 46 | 31 | 23 | 0 |
| Sodium Metasilicate Hydrate | 0 | 0 | 0 | 0 | 0 | 0 | 9 |
| Sodium Silicofluoride | 22 | 14 | 11 | 22 | 14 | 11 | 0 |
| Plaster of Paris | 0 | 0 | 0 | 0 | 0 | 0 | 18 |
| Guar Gum (GUARTEC) | 0 | 0 | 0 | 0 | 0 | 0 | 4 |
| Acrylic Modified Starch (HENKEL SGP-502) | 4 | 4 | 3 | 0 | 4 | 3 | 0 |

Each of the compositions was vigorously blended with a water saturated soil comprising silt, sandy loam, clay, gravel, and sand in the ratio of about 4 to 5 parts by weight of composition for each 100 parts by weight of soil.

Laboratory tests were made on each of the stabilized soils for VICAT penetration, water immersion penetration, and over-all compatibility.

With each, resistance to penetration increased rapidly with time to a maximum in about one hour. Also, each retained its compressive strength even after immersion in water for periods of 24 to 72 hours; there was no significant penetration of water.

It was noted that soil stabilizing composition No. 7 was slower setting and this is apparently due to the absence of hydrated sodium silicate powder.

EXAMPLE 8

As in Examples 1 to 7, a soil stabilizing composition was formed by admixing the following components:

|  | % by Weight |
|---|---|
| Portland Cement | 67 |
| Hydrated Sodium Silicate Powder | 3 |
| Sodium Metasilicate Hydrate | 8 |
| Plaster of Paris | 17 |
| Guar Gum | 3 |
| Quaternary Ammonium Surfactant (HYAMINE 3500) | 2 |

The resultant soil stabilizing composition was field tested by being used to stabilize trenches by the City Water Board of San Antonio trenches. Spoil from trenches was treated by being blended with this stabilizing composition in the ratio of 50 pounds of composition for each 0.5 cubic yard of spoil.

The blended mixture was then placed in the trench and tamped and in almost every instance the tamped surface was immediately available for retopping and/or normal use. With very wet spoil it required about 1 hour before retopping could be effected.

EXAMPLE 9

As in Examples 1 to 7, a soil stabilizing composition was formed by admixing the following components:

|  | % by Weight |
| --- | --- |
| Portland Cement | 76 |
| Plaster of Paris | 4 |
| Hydrated Sodium Silicate Powder | 3.3 |
| Sodium Metasilicate Hydrate Powder | 15 |
| Mixed Dimethy Esters of Succinic, Adipic, and Glutaric Acids (DBE) | 0.7 |
| Iron Oxide (chrome free) | 1 |

The resultant composition was field tested in the same manner as set forth in Example 8 for that composition with equally good results.

The pulverulent compositions of the present invention can be applied as powders or slurried in water and applied to all varieties and classes of soils to achieve rapid drying of saturated soils, permit compaction or densification of the soil, induce rapid solidification and permit traffic over the repair, prevent subsidence, and prevent water migration.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined in the appended claims.

What is claimed is:

1. A soil stabilizing composition consisting essentially of 50 to 80 percent by weight of Portland cement, 8 to 25 percent by weight of a hydrated alkali metal silicate powder, and 2 to 10 percent by weight Plaster of Paris.

2. The composition of claim 1 including a sodium silicofluoride present in an amount of from about 4 to 10 percent by weight.

3. The composition of claim 1 including at least one dimethyl ester of a dibasic acid as a dust suppressant in an amount of from about 0.5 to 3 percent by weight.

4. A pulverulent soil stabilizing composition consisting essentially of 50 to 80 percent by weight Portland cement, 8 to 25 percent by weight of a hydrated alkali metal silicate powder, 4 to 10 percent by weight of an alkali metal silico-fluoride, 0.5 to 3 percent by weight of a blend of dimethyl esters of succinic, adipic, and glutaric acids, and 2 to 10 percent by weight Plaster of Paris.

5. A pulverulent soil stabilizing composition consisting essentially of 50 to 80 percent by weight Portland cement, 8 to 25 percent by weight of a mixture of hydrated sodium silicate and hydrated sodium metasilicate powders, 4 to 10 percent by weight of sodium silicofluoride, 0.5 to 3 percent by weight of a blend of dimethyl esters of succinic, adipic, and glutaric acids, and 2 to 10 percent by weight Plaster of Paris.

6. The method of stabilizing soil consisting essentially of admixing therewith a composition comprising Portland cement and a hydrated alkali metal silicate and compressing the mixture.

7. The method of claim 6 wherein about 1 to 5 parts by weight of the composition are used for each 100 parts by weight of soil.

8. The method of claim 7 wherein water is added to the soil to raise the moisture level of the soil to about 7 to 10 percent moisture.

9. The method of claim 6 or 7 in which the composition also contains sodium silicofluoride.

10. The method of claim 6 or 7 wherein the hydrated alkali metal silicate consists essentially of a mixture of hydrated sodium silicate powder and hydrated sodium metasilicate powder and the composition also contains Plaster of Paris; the percentage by weight of components being 50 to 80 percent Portland cement, 8 to 25 percent hydrated alkali metal silicate powder, 4 to 10 percent Plaster of Paris, and 0.5 to 3 percent of a blend of dimethyl esters of succinic, adipic, and glutaric acids.

* * * * *

UNITED STATES PATENT AND TRADEMARK OFFICE
CERTIFICATE OF CORRECTION

PATENT NO. : 4,545,820

DATED : October 8, 1985

INVENTOR(S) : William A. Mallow

It is certified that error appears in the above-identified patent and that said Letters Patent are hereby corrected as shown below:

Column 3, line 10, under the heading "Preferred", the "50-80" of Hydrated Alkali Metal should be --8-25--.

Signed and Sealed this

Third Day of December 1985

[SEAL]

Attest:

Attesting Officer

DONALD J. QUIGG

Commissioner of Patents and Trademarks